Aug. 25, 1936.  W. D. WHITE  2,052,331
COMBINATION TOOL
Filed Oct. 6, 1934  2 Sheets-Sheet 1
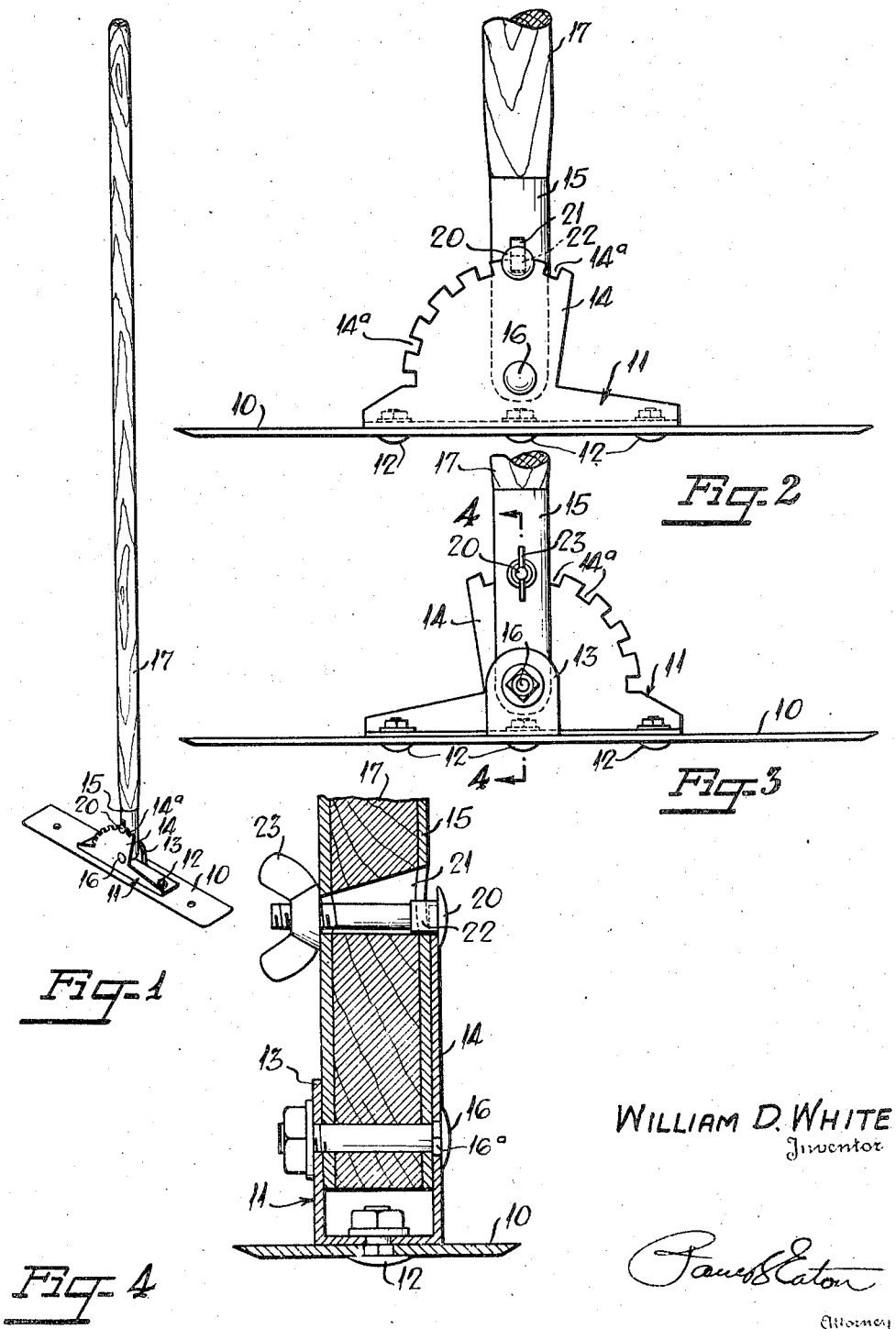
WILLIAM D. WHITE
Inventor Aug. 25, 1936.  W. D. WHITE  2,052,331
COMBINATION TOOL
Filed Oct. 6, 1934  2 Sheets-Sheet 2
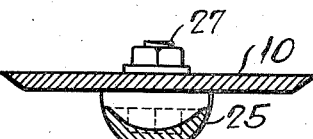
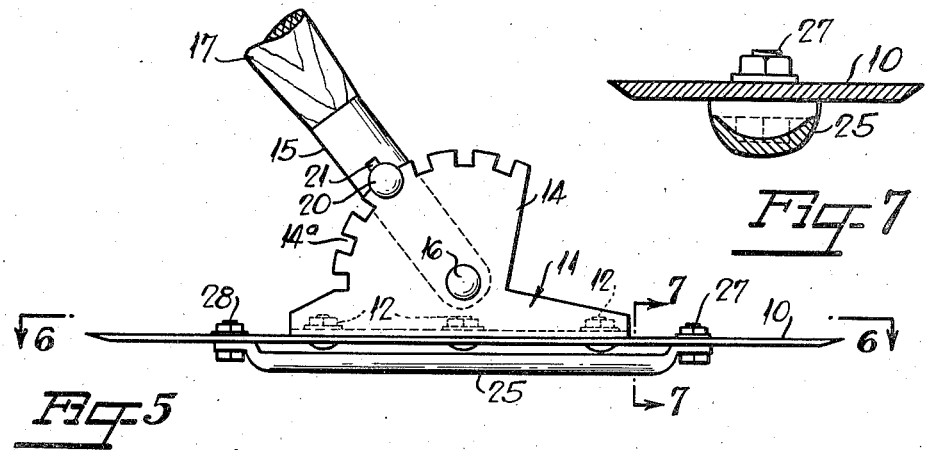
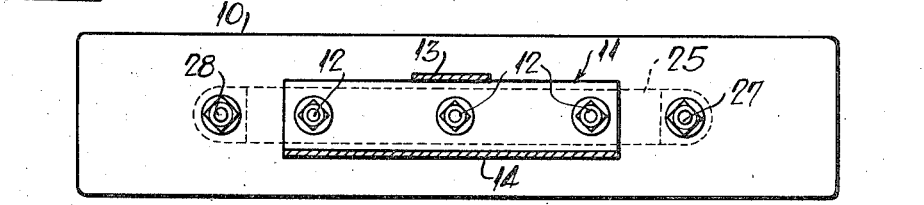
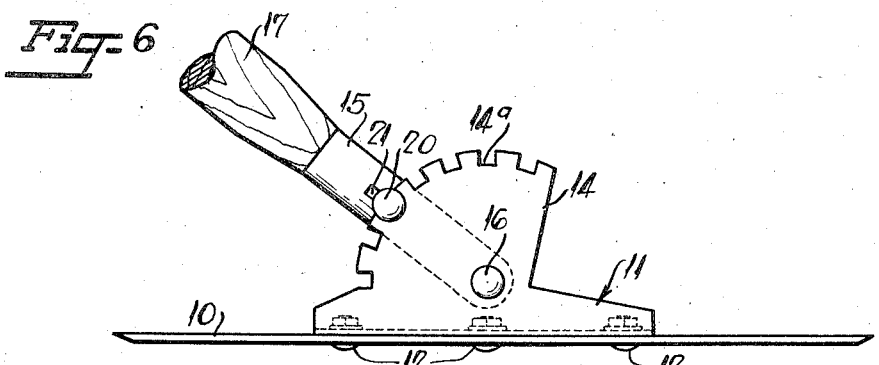
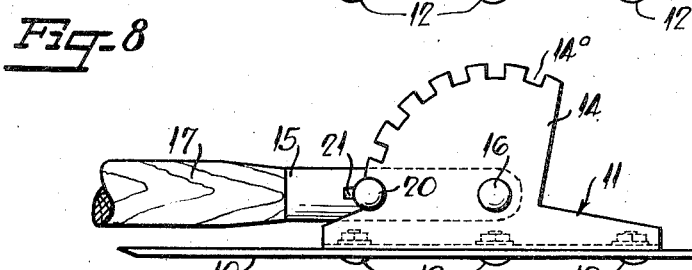
Inventor:
WILLIAM D. WHITE
By Paul S. Eaton
Attorney Patented Aug. 25, 1936

2,052,331

UNITED STATES PATENT OFFICE 2,052,331

COMBINATION TOOL

William Dabney White, Greensboro, N. C.

Application October 6, 1934, Serial No. 747,160

1 Claim. (Cl. 97—67)

This invention relates to an implement and more especially to a combination hoe having a blade which is capable of being adjusted at different angles to the handle.

It is, therefore, an object of this invention to provide an implement comprising a tool and a handle which may be converted into different tools by changing the angularity of the tool with relation to the handle. My invention may be converted into several types of implements such as shovel, hoe, spade, weed cutter, lawn trimmer, edge trimmer and the like, and eliminates the necessity of the user carrying several kinds of separate tools to his work.

It is a further object of this invention to provide means for quickly and securely adjusting the blade at different angles with relation to the handle. The blade has a member secured thereto which has an arcuate notched portion to which the handle is pivoted. A bolt is adapted to penetrate these notches and also a V-shaped slot in the handle. By loosening the wing nut the head of the bolt may be disengaged from the notches without the necessity of removing the bolt from the slot and therefore provides means for quickly adjusting the blade and prevents loss of the bolt or nut.

Another object of the invention is to provide a guard on the lower side of the blade to prevent the blade from digging in the ground when the implement is being used for cutting grass on a lawn and the like.

Some of the objects of the invention having been stated, other objects will appear as the description proceeds when taken in connection with the accompanying drawings, in which:—

Figure 1 is an isometric view of the invention;

Figure 2 is an elevation of the lower portion of Figure 1;

Figure 3 is an elevation of the opposite side of the invention as shown in Figure 2;

Figure 4 is a vertical sectional view taken along line 4—4 in Figure 3;

Figure 5 is a view similar to Figure 2 but showing a guard member secured to the lower portion of the blade and also showing the handle disposed at a different angle;

Figure 6 is a sectional plan view taken along line 6—6 in Figure 5;

Figure 7 is a sectional view taken along line 7—7 in Figure 5;

Figure 8 is a view similar to Figure 2 but showing the handle disposed at an angle to allow the implement to be used as a shovel or for cutting plant roots;

Figure 9 is a view similar to Figure 2 but showing the handle disposed at an angle to allow the implement to be used as a spade or hole digger, and as a sidewalk edger, etc.

Referring more particularly to the drawings, the numeral 10 denotes a suitable oblong rectangular blade to which is secured a bracket 11 by any suitable means such as bolts 12. Bracket 11 has upstanding members 13 and 14 integral therewith between which is pivotally mounted a collar 15 on handle 17 by any suitable means such as bolt 16 which penetrates the upstanding members, the collar and the handle. Bolt 16 has a squared portion 16a fitting into a squared hole in member 14 which causes bolt 16 and portion 11 to move together at all times, thus preventing the nut thereon from working loose.

The lower end of handle 17 is secured in collar 15 and this handle is also penetrated by bolt 16 thereby insuring that the handle will remain in the collar at all times.

Directly above bolt 16 is another bolt 20 which penetrates a V-shaped slot 21, said slot being cut in collar 15 and handle 17. Bolt 20 has a square portion 22 which is adapted to fit in any one of the notches 14a of upstanding member 14 when the handle has been adjusted at the desired angularity. After the portion 22 is placed in the desired notch 14a a wing nut 23 is screwed home on bolt 20 to firmly hold the handle in adjusted position. If it is desired to place the handle 17 at a different angle, the wing nut 23 is loosened thereby allowing the right-hand end (Fig. 4) of bolt 20 to be moved in slot 21 and out of engagement with the notches 14a. In this position the blade 10 may be easily turned about bolt 16 as a pivot until it is at the desired position. It is therefore seen that very little time and effort is required to adjust the blade at different angles in order that the implement may serve in a different capacity.

In Figure 5 a safety device or guard is secured to the lower edge of blade 10 by any suitable means such as bolts 27 and 28. When the implement is used to cut grass and the like on lawns this attachment serves a very useful purpose such as preventing the cutting edge of the blade 10 from digging into the earth and marring the appearance of the lawn. It also serves as a guiding member whereby the grass may be cut at a uniform height.

As previously stated, the purpose for which the implement is used determines the angularity that the handle is set with respect to the blade. It is also evident that the height of the user will also affect the angularity.

In Figures 1, 2, and 3 the blade is shown disposed at right angles to the handle and in this position the implement will serve the purpose of a hoe with four cutting edges available. In Figure 3, if the handle should be moved one or two notches to the right, or one notch to the left the blade would be set at the proper angle to be used as a weeder, where the implement is swung back and forth for cutting weeds, grass and the like on each stroke of the blade. If desired, the guard 25 may be removed and the implement still used for weeding purposes since the guard is purely an auxiliary feature to be used when more accurate work is desired.

When adjusted to the angle shown in Figure 5 one of the uses of the implement could be that of cutting weeds or grass on a hillside.

Figure 8 shows the blade disposed at another angle which allows the implement to be used as a shovel. Of course the angle of the handle with respect to the blade will vary, depending upon the purpose for which the shovel is being used and the height of the user.

Figure 9 shows still another position of the blade which enables one to use the implement as a spade or hole digger, or sidewalk edger, etc.

These different positions of the blade are shown to illustrate a few of the many uses to which the implement may be put. It is evident that each different angle at which the blade is set will allow the implement to serve in a different capacity and the positions shown in the drawings merely serve as typical examples.

In the drawings and specification there has been set forth a preferred embodiment of the invention, and although specific terms are employed, they are used in a descriptive and generic sense only, and not for purposes of limitation, the scope of the invention being set forth in the appended claim.

I claim:

A gardener's tool comprising an elongated rectangular blade having two parallel cutting sides and two parallel cutting ends, a handle, means pivotally connecting the blade to the handle so the handle can be swung in a plane passing longitudinally through the blade at right angles to the blade, means for adjusting the position of the blade with relation to the handle.

WILLIAM DABNEY WHITE.